United States Patent [19]

Scribner

[11] 4,228,210
[45] Oct. 14, 1980

[54] PLATE OR THE LIKE WITH SERRATED OPENING

[75] Inventor: Jack B. Scribner, Dayton, Ohio
[73] Assignee: TRW Inc., Cleveland, Ohio
[21] Appl. No.: 873,545
[22] Filed: Jan. 30, 1978
[51] Int. Cl.² .......................... F16C 27/02; B32B 3/10
[52] U.S. Cl. ................................ 428/131; 29/149.5 R; 308/237 R
[58] Field of Search ............................. 428/65, 131; 29/149.5 R; 308/26, 28, DIG. 11, 237 R, 22

[56] References Cited

U.S. PATENT DOCUMENTS

| | | | |
|---|---|---|---|
| 1,620,043 | 3/1927 | Stanley | 428/131 |
| 2,064,723 | 12/1936 | Benge | 428/131 |
| 2,793,087 | 5/1957 | Hayes | 308/26 |
| 2,839,340 | 6/1958 | Merchant | 308/26 |
| 3,068,131 | 12/1962 | Morton | 428/65 |
| 3,107,946 | 10/1963 | Drake | 308/26 |
| 3,318,642 | 5/1967 | Peterson | 308/26 |
| 3,873,168 | 3/1975 | Viola | 428/131 |
| 3,896,247 | 7/1975 | Descléve | 428/131 |
| 3,935,631 | 2/1976 | Doerner | 308/237 R |
| 3,953,089 | 4/1976 | Dainin | 308/237 R |
| 3,980,352 | 9/1976 | Carlson | 308/26 |
| 4,006,659 | 2/1977 | Wurzel | 308/DIG. 11 |

FOREIGN PATENT DOCUMENTS

| | | | |
|---|---|---|---|
| 431828 | 3/1925 | Fed. Rep. of Germany | 308/26 |
| 1187749 | 9/1959 | France | 308/26 |

*Primary Examiner*—Ellis P. Robinson
*Attorney, Agent, or Firm*—Biebel, French & Nauman

[57] ABSTRACT

A plate or the like for receiving a press-fitted sleeve-like member, such as a ball bearing or the like, is formed with an opening defined by a series of arcuately spaced, axially extending lands alternating with a series of axially extending relieved portions between the lands. The lands define segments of a circle which form a close or an interference fit with the outside surface of the sleeve-like member while the relieved portions define spaces for the flow or movement of excess material during the press fitting of the member into the plate, thereby avoiding exceeding the maximum allowable pressing forces, to reduce the likelihood of distortion of the member. The relieved portions also provide spaces for bonding cement or for lubrication, if desired.

5 Claims, 7 Drawing Figures

PLATE OR THE LIKE WITH SERRATED OPENING

BACKGROUND OF THE INVENTION

In small precision gear units, it is common to support the shafts on bearings between parallel spaced-apart support plates. Commonly, race-type miniature bearings are used, such as ball bearings, which must be accurately located and positioned in the support plate. Commonly, the openings for the bearing races are made in a punch press in which it is possible to hold close center-to-center distances. However, in a punch press it is considerably more difficult to hold very close tolerances for the diameter of the bearing openings. Accordingly, it has been necessary to form a punched opening which is slightly smaller than desired, and then, in a second operation, to ream the hole to the precise size required for press fitting the bearing assembly into the opening. The tolerances which must be held are particularly critical where a small precision ball bearing is to be press fitted into the opening, and the opening must therefore be very close or an interference fit. The maximum allowable pressing forces must not be exceeded, otherwise the bearing may be distorted, or the bearing moved off center, or both. Additionally, the reaming or finishing step provides an opportunity for the precise center-to-center distance to be displaced.

A further problem in fitting bearings into bearing support plates resides in the fact that the bearing manufacturers provide bearings having nominal O. D. sizes, but these sizes vary within certain tolerance limits, and these tolerance limits may exceed the tolerances which the bearing manufacturers themselves specify for the plate opening, to provide a good press fit. In other words, in precision units, it may be necessary to hand-size or select the bearings so that the tolerances between the O. D. of the bearing and the I. D. of the hole in the plate are not exceeded.

SUMMARY OF THE INVENTION

The present invention is directed to an improved plate or plate-like member for receiving a press-fitted cylindrical or tubular member, such as a bearing, in which the opening, which may be made in a punching operation, is defined by a series of arcuately spaced, inwardly projecting portions alternating with a series of intermediate relieved portions. The interfitting projecting portions form a close or an interference fit with the O. D. of the cylindrical member, such as with the outer cylindrical surface of the outer race of a precision miniature ball bearing. The intermediate relieved portions provide regions which the metal of the plate may fall away or flow, so that the maximum pressing force is not exceeded, regardless of slight variations in sizes between individual bearings.

In the preferred embodiment of the invention, the inwardly extending projections are more particularly formed as a series of arcuately extending lands, each of which extends axially substantially the length of the opening, separated by the intermediate relieved portions which also extend axially of the plate opening. The land surfaces define the outline of a circle and themselves provide a very close or an interference fit with the outside diameter of the cylindrical member. The intermediate relieved portions again permit or provide a clearance for flow of metal and in addition provide grooves, if desired, for a sealant, or provide spaces which may act as an oil reservoir. The latter is often desirable when fitting a sleeve-type bearing.

The pressing force may accurately be controlled by adjusting or varying the relative spacings of the lands and grooves. Thus, the pressing pressures may be adjusted by appropriately adjusting the percentage of land portions as compared to the percentage of intermediate grooved or relieved portions, or in other words, by varying the size or spacing of the contact areas defined by the lands. Thus, by maintaining the proper press requirements, the likelihood of distortion to a bearing, for example, is substantially reduced or is eliminated.

It is accordingly an important object of the invention to provide an improved plate construction for receiving cylindrical or sleeve-like members, such as bearings, in which an opening is defined by alternating inwardly projecting portions and intermediate relieved portions.

A more particular object of the invention is to provide a bearing plate or the like in which a bearing receiving opening is defined by a series of arcuate, axially extending lands separated by intermediate grooves.

A still further object of the invention is to provide the means and method by which an opening can be formed in a punch press to receive a bearing or the like without exceeding the allowable pressing forces on the bearing, and to eliminate the need for precision reaming operations to size the bearing hole, and to eliminate the necessity for hand fitting of the parts.

These and other objects and advantages of the invention will be apparent from the following description, the accompanying drawings and the appended claims.

DESCRIPTION OF PREFERRED EMBODIMENT

Figure 1:
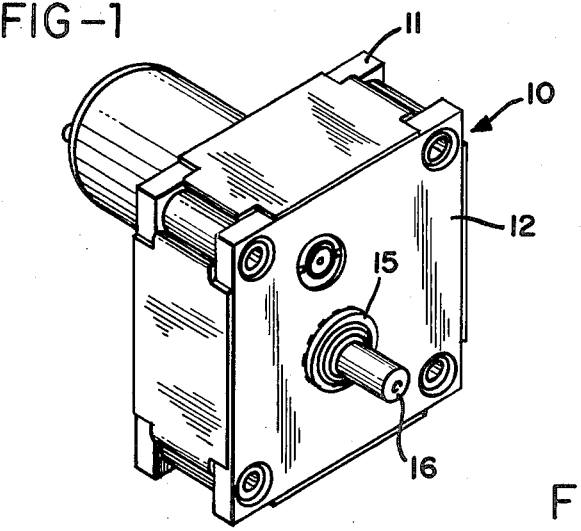
FIG. 1 is a perspective view of a reduction gear assembly incorporating a bearing plate made according to this invention.
Figure 2:
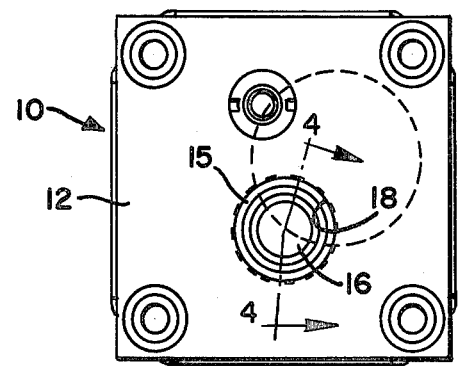
FIG. 2 is a front elevation of the assembly of FIG. 1.
Figure 4:
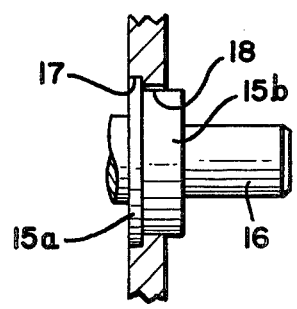
FIG. 4 is a vertical fragmentary section through the plate showing the bearing (and associated shaft) inserted therein taken generally along line 4—4 of FIG. 2.

Referring to FIG. 1, a gear reduction assembly is illustrated generally at 10 in FIG. 1 to which the present invention is applied. The assembly 10 includes a pair of parallel spaced-apart plates 11 and 12 which rotatably support the gear reduction shafts. The invention is shown in the drawings as being applied to the front bearing plate 12 which retains a shouldered precision ball bearing 15 (FIG. 4), the latter rotatably supporting the gear reduction output shaft 16.

Figure 3:
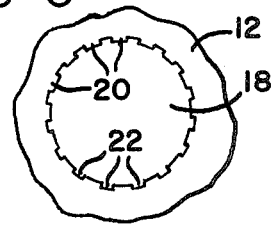
FIG. 3 is an enlarged elevational view of the portion of the plate showing the bearing-received opening of this invention.
Figure 5:
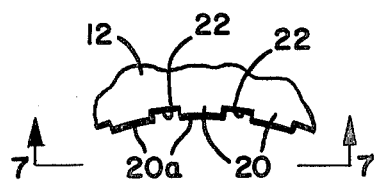
FIG. 5 is an enlarged fragmentary detail of the plate at the opening prior to the insertion of the bearing.

The plate 12 is provided with a stepped bearing-receiving opening as shown in FIG. 3. The larger diameter relieved portion 17 of the opening is conventionally formed to receive the shoulder 15a of the bearing 15 by a counter-boring operation. However, the smaller inside diameter 18 receives the outer cylindrical surface 15b of the bearing 15 and is defined by a series of arcuately spaced, inwardly projecting portions (FIG. 5), separated or alternating with a series of relieved portions 22.

The projecting portions 20 in effect define a series of axially extending surfaces or lands 20a which form segments of a circle, and which extend substantially the axial depth of the opening 18. The relieved portions 22 are also extended axially of the opening 18, but the contour of the relieved portions is not critical. The opening 18 may be formed in a single operation in a punch press, and the diameter of the circle defined by the lands 20a is chosen as to be a very close or an interference fit with the outside surface of the member to be press-fitted, such as the surface 15b of the bearing 15.

Figure 6:
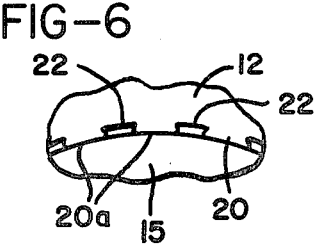
FIG. 6 is a view similar to FIG. 5 showing the bearing in place.

In the case of a ball bearing, the bearing bores commonly used required a 0.0003" to 0.0005" tolerance as recommended by the bearing manufacturers. Commmonly, these tolerances are produced by careful machining of the bore, at a considerable expense. The necessity for maintaining this accurate tolerance, and the necessity for subsequent machining operations to achieve the tolerance as well as to maintain the center location of the bore, is obviated by the use of the serrated bore of the present invention. The serrated design provides means for the adjustment of the pressing pressure, by varying the contact area of the lands, so that the maximum allowable pressing force on the bearing 15 is not exceeded. The relieved portions 22 provide space for displacement of the metal moved from the portions 20 in the bearing pressing operation. In addition, the relieved portions 22 define axially extending grooves after the bearing has been inserted, as shown in FIG. 6, and thus provide spaces for receiving a locking compound, if desired. By maintaining the proper press fit requirements, the risk of distortion of the bearing is substantially reduced.

Figure 7:
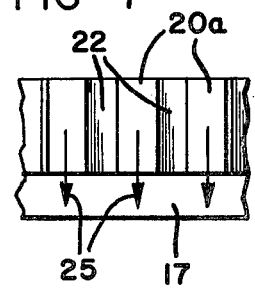
FIG. 7 is a fragmentary view of the opening looking generally along the line 7—7 in FIG. 5.

The movement or flow of the metal at the projections 20 when the bearing 15 is inserted is both sideways into the relieved portions 22, as shown in FIG. 6, and axially as shown by the arrows 25 in FIG. 7. However, very little of the material is normally displaced or moved in such a pressing operation.

It will accordingly be seen that a plate member is provided in which cylindrical or tubular members, such as bearings or the like, may be press fitted without the necessity of providing a high precision bore. Delicate ball bearing assemblies may thus be press fitted while maintaining center-to-center distances with the assurance that the maximum allowable pressing forces will not be exceeded. The relative widths of the lands 20a in relation to the grooves 22 and the axial extent thereof may be varied, and in addition, the surface configuration of the lands 20a may be chosen as to provide a desired pressing force. Preferably, the land surfaces in cross section, define the outline of a circle of desired diameter, as mentioned above. However, it is not necessary that the surfaces 20a be defined as segments of a circle, as other configurations such as points or serrations may be employed.

The invention is not to be construed as limited to bearing plates employed in gear reduction units, but may be employed wherever a cylindrical member, such as a bearing, is to be press-fitted into its support plate. As an example, an end plate of an electric motor may be made as a casting, and its bearing-receiving opening may be defined as an arcuate series of axially extending lands 20a formed in the casting itself.

While the form of apparatus herein described constitutes a preferred embodiment of this invention, it is to be understood that the invention is not limited to this precise form of apparatus, and that changes may be made therein without departing from the scope of the invention.

What is claimed is:

1. An improved plate and press-fitted bearing member assembly, in which an annular bearing member having a cylindrical outer surface is press-fitted into an opening formed in a plate in which maximum bearing pressing forces are established to prevent damage to the bearing member during assembly, comprising:
   (a) a metallic bearing support plate,
   (b) means in said plate defining a bearing-receiving opening, the inside diameter of said opening being defined by a series of arcuately spaced, inwardly-projecting metallic land portions alternating with a series of intermediate relieved portions, said inwardly-projecting land portions defining a generally circular outline the diameter of which forms an interference fit with the outer cylindrical surface of said bearing member, and the relieved portions providing spaces for the flow of metal plate material during the press fitting of said bearing member into said plate thereby avoiding exceeding said maximum pressing force on said bearing member, and
   (c) an annular bearing member press-fitted into said bearing receiving opening in said plate.

2. The assembly of claim 1 in which said bearing member is a precision ball bearing.

3. The assembly of claim 2 in which said ball bearing has an annular shoulder, and means in said plate defining a counterbore in surrounding relation to said opening to receive said bearing shoulder.

4. The assembly of claim 1 in which said inwardly projecting land portions terminate at their inner ends at a circularly curved surface.

5. The assembly of claim 1 in which said inwardly projecting land portions extend axially a distance less than the axial depth of said opening.

* * * * *